May 6, 1930.  F. NOVOTNY  1,757,583
COFFEE RECEPTACLE
Filed June 26, 1929
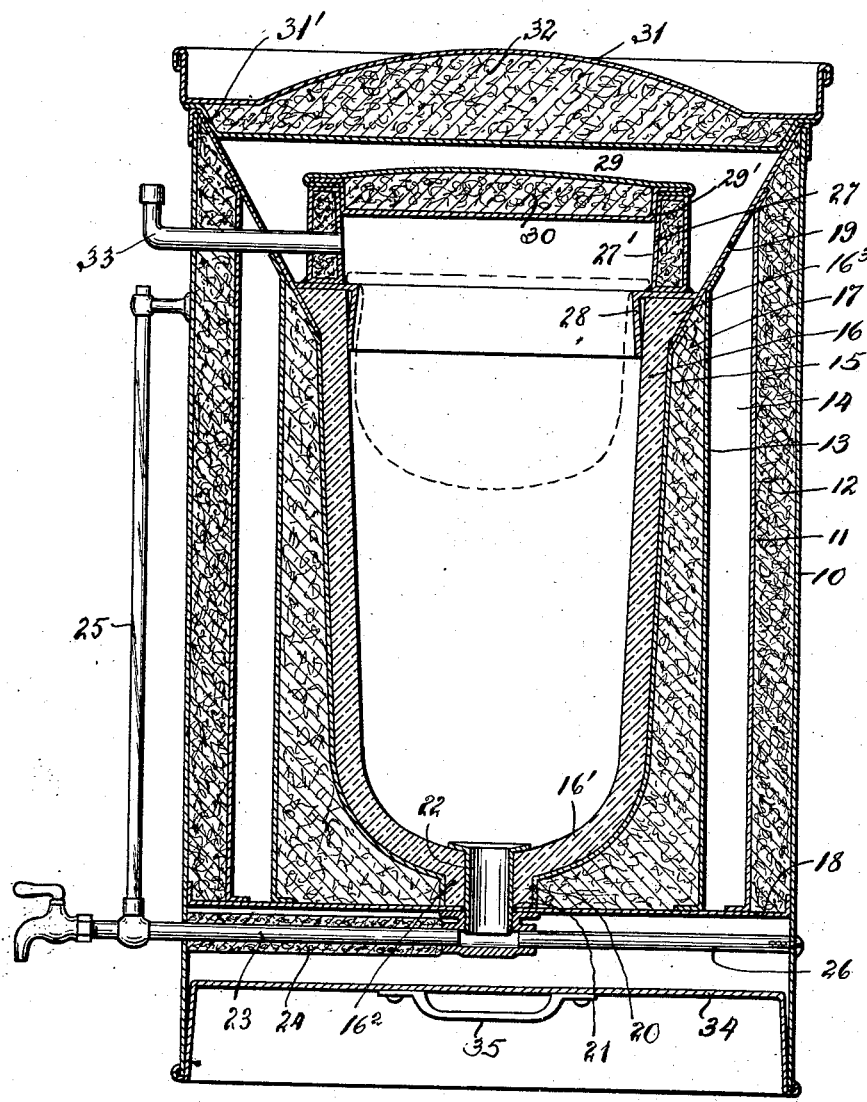

Patented May 6, 1930

1,757,583

UNITED STATES PATENT OFFICE

FERDINAND NOVOTNY, OF NEW YORK, N. Y.

COFFEE RECEPTACLE

Application filed June 26, 1929. Serial No. 373,748.

The present invention relates to coffee urns or receptacles.

It is not desirable to cook or boil coffee as the flavor thereof soon is spoiled by such treatment and also harmful effects result to the consumer of such overboiled fluids. It is therefore an object of my invention to have the coffee brewed in an urn or receptacle which is not heated by fire but in which boiling water led into it from a separate receptacle is passed through the coffee netting and allowed to filter slowly therethrough, said urn being so constructed as to substantially retain the boiling temperature for a considerable time.

A further object is to provide such urn which can be easily and cheaply manufactured.

With the above and other objects in view my invention consists in the novel construction, combination and arrangement of elements to be hereinafter more fully described and shown in the accompanying drawing in which similar reference characters denote corresponding parts and in which the figure represents a longitudinal sectional elevation of my device.

My device comprises an outer shell 10 of metal or other suitable material which may be cylindrical or have any other cross section. Centrally located in said outer shell is a second similar smaller shell 11 and the space between said two shells is adapted to be filled with a heat insulator 12 of asbestos or the like. A third similar smaller shell 13 is centrally located in said shell 11 and the space between said two last named shells forms an air chamber 14. Mounted within said shell 13 is a fourth shell 15 which is shaped to fit the contour of a coffee container 16 of earthern ware, porcelain, heat resisting glass or similar material. The space between said shell 15 and shell 13 is filled with insulating material 17. The said shells 10, 11, 13 and 15 rest with their lower ends on a suitable bottom 18 which may be removably attached to said outer shell 10 in any suitable manner. In height said shells gradually increase toward the outer shell and are closed by a conically shaped or tapered top 19 whose open narrower end is of the same diameter as that of the innermost shell 15. This top 19 is suitably attached to the walls of said shells.

A central opening 20 is provided in the bottom of said shell 15 and a corresponding opening 21 is provided in the bottom 18. The rounded or spherically shaped bottom 16' of the container 16 is provided with a central opening 22 and a neck like portion $16^2$ projecting from the outer face thereof around said opening 22 and serving as a centering means. This neck $16^2$ is adapted to snugly fit in the opening 20 in said shell 15.

Suitably attached to said container 16 and adapted to communicate with its said opening 22 is a discharge pipe 23 through which the fluid in the container may be tapped off. The discharge pipe may be suitably insulated as at 24. 25 denotes the usual gauge glass. 26 is a reinforcing member which is attached to the discharge pipe 23 and to the wall of said shell 10 in any suitable manner.

The upper edge of the receptacle 16 is provided with a tapered annular shoulder $16^3$ which bears on the lower end of the top 19. To close the open top of said container I provide an insulation filled annular wall 27 which is suitably mounted to the top edge of the coffee container as by soldering it to a metal ring 28 of soft metal which is bent over the side edges of the said top edge $16^3$ of said coffee container. The inner face 27' of said wall 27 is tapered slightly. A metal hollow cover 29 provided with a heat insulation filling 30 having a correspondingly tapered side wall 29' is adapted to snugly fit in the top of said wall 27 to seal the contents of the coffee container.

A second hollow metal cover 31 filled with heat insulation material 32 may be provided to form an outer cover. The side walls 31' of said outer cover are also tapered to fit on the tapered top 19.

A suitable inlet tube 33 is provided projecting through the shells and communicating with the container 16.

At the lower end of shell 10 and frictionally or otherwise removably engaging the same is a bottom 34 having an inverted dish shape. The said bottom is provided with a handle 35 to facilitate removal.

In use the boiling water is permitted to enter the tank through inlet 33 with the covers 29 and 31 in closed position. The water passes through the coffee netting and slowly filters through said netting. The packing of the urn insures the retention of the temperature practically constant for a comparatively long period of time.

The device can be conveniently cleaned on removing the covers 29 and 31.

Of course the device can be modified in many ways without departing from the spirit of my invention. I therefore, do not wish to be limited to the details shown and described.

What I claim is:

1. A coffee receptacle comprising an outer casing, a plurality of heat insulated walls spaced from each other inside said casing, supporting means for said walls, said walls increasing progressively in height towards the outer casing, covering means for the top edges of said walls, a container mounted interiorly of the innermost wall, heat insulated covering means for said container, inlet and outlet means to said container and an overall cover for said receptacle adapted to rest on said wall top covering means.

2. A coffee receptacle comprising an outer metal shell, a bottom in said shell, a second inner shell concentric with said first named shell, a heat insulating filling between said two shells, a third concentric shell inside of said second shell, a fourth shell concentric with said other shells, a heat insulation filling between said third and fourth shell, an earthenware coffee container adapted to fit in the said fourth shell, inlet and outlet means for said container, a heat insulated cover structure mounted at the top of said container, a cover adapted to snugly fit in said structure and an overall cover for said receptacle.

3. A coffee receptacle comprising an outer casing, a plurality of concentrically arranged shells mounted inside said casing, a heat insulation filling between alternate pairs of shells, said shells increasing in height progressively towards said outer casing, a top plate joined to the upper edges of said sells, a container adapted to fit inside the innermost shell, a heat insulated covering means for said container, inlet means near the top of said container and heat insulated outlet means at the bottom thereof and an overall heat insulated cover for said receptacle adapted to rest on said top plate.

4. A coffee receptacle comprising an outer casing, a plurality of heat insulated walls spaced from each other inside said casing, supporting means for said walls, covering means for the top edges of said walls, a container mounted interiorly of the innermost wall, a heat insulated superstructure adapted to be mounted on said container, a heat insulated cover adapted to be mounted in said superstructure, inlet and outlet means to said container, and an overall heat insulated cover for the top of said receptacle.

5. A fireless coffee receptacle comprising an outer casing, an inner casing, insulation packing between said two casings, a second inner casing spaced from said first inner casing, a third inner casing, insulation packing between said second and third inner casings, a bottom in said outer casing on which said other casings are mounted, an earthenware container adapted to snugly fit inside said third inner casing, heat insulated covering means for said container mounted thereon, an overall heat insulated cover adapted to be mounted over the open top of said outer casing and inlet and outlet means to said receptacle.

Signed at New York, this 21st day of June, 1929.

FERDINAND NOVOTNY.